United States Patent
Tsai et al.

(10) Patent No.: US 11,492,067 B2
(45) Date of Patent: Nov. 8, 2022

(54) BICYCLE BRAKING AND LOCKING MECHANISM

(71) Applicant: TEKTRO TECHNOLOGY CORPORATION, Changhua County (TW)

(72) Inventors: Szu-Fang Tsai, Changhua County (TW); Bo-Yi Liao, Changhua County (TW)

(73) Assignee: TEKTRO TECHNOLOGY CORPORATION, Changhua County (TW)

( * ) Notice: Subject to any disclaimer, the term of this patent is extended or adjusted under 35 U.S.C. 154(b) by 0 days.

(21) Appl. No.: 17/466,112

(22) Filed: Sep. 3, 2021

(65) Prior Publication Data

US 2022/0097797 A1 Mar. 31, 2022

(30) Foreign Application Priority Data

Sep. 25, 2020 (TW) ................................ 109133268

(51) Int. Cl.
*B62L 3/02* (2006.01)

(52) U.S. Cl.
CPC ...................................... *B62L 3/02* (2013.01)

(58) Field of Classification Search
CPC .......... B62L 3/02; B62L 3/023; B62K 23/06; B62K 23/02; B62M 25/04
USPC ........................................................ 74/502.2
See application file for complete search history.

(56) References Cited

U.S. PATENT DOCUMENTS

| 3,732,787 A * | 5/1973 | Yamaguchi ............ B62M 25/08 74/489 |
| 5,109,968 A * | 5/1992 | Pollitt ...................... F16D 23/12 74/625 |
| 6,003,639 A * | 12/1999 | Buckley ................ F16D 55/228 188/26 |
| 11,066,121 B1 * | 7/2021 | Snead ..................... B62K 23/06 |
| 2009/0229927 A1 * | 9/2009 | Brioschi ................. B62L 3/023 188/24.11 |
| 2013/0228405 A1 * | 9/2013 | Tsai ....................... B62J 45/422 188/344 |

(Continued)

FOREIGN PATENT DOCUMENTS

| JP | 06-255565 A * | 9/1994 | ............ B62M 25/04 |
| WO | WO 2006030379 A1 * | 3/2006 | ................. B62L 3/02 |

(Continued)

OTHER PUBLICATIONS

Machine translation of JP 06-255565A, Sep. 13, 1994 (Year: 1994).*

*Primary Examiner* — Vinh Luong
(74) *Attorney, Agent, or Firm* — Maschoff Brennan

(57) ABSTRACT

A bicycle braking and locking mechanism is configured to be mounted on a handlebar. The bicycle braking and locking mechanism includes a brake assembly, a first driving component, and a second driving component. The brake assembly includes a main body, a piston, and a link. The main body is configured to be mounted on the handlebar and has a pressure chamber, the piston is movably located in the pressure chamber, and the link is connected to the piston. The link is configured to be selectively driven by the first driving component or the second driving component so as to move the piston with respect to the pressure chamber.

4 Claims, 5 Drawing Sheets

(56) References Cited

U.S. PATENT DOCUMENTS

| | | | | |
|---|---|---|---|---|
| 2016/0177976 A1* | 6/2016 | Ruopp | ................... | F15B 7/08 |
| | | | | 60/592 |
| 2016/0200392 A1* | 7/2016 | Bradley | ............... | B60T 17/043 |
| | | | | 188/344 |
| 2017/0227022 A1* | 8/2017 | Ol | ......................... | B62L 3/023 |
| 2019/0202527 A1* | 7/2019 | Shimizu | ................ | F16D 23/12 |
| 2020/0079465 A1* | 3/2020 | Tsai | ....................... | B62L 3/023 |

FOREIGN PATENT DOCUMENTS

| | | | | |
|---|---|---|---|---|
| WO | WO 2008056379 A1 * | 5/2008 | ............... | B62L 3/02 |
| WO | WO 2010073276 A1 * | 7/2010 | ............... | B62L 3/02 |
| WO | WO 2014016124 A1 * | 1/2014 | ............... | B62L 3/00 |

* cited by examiner

BICYCLE BRAKING AND LOCKING MECHANISM

CROSS-REFERENCE TO RELATED APPLICATIONS

This non-provisional application claims priority under 35 U.S.C. § 119(a) on Patent Application No(s). 109133268 filed in Taiwan, R.O.C. on Sep. 25, 2020, the entire contents of which are hereby incorporated by reference.

TECHNICAL FIELD

The disclosure relates to a braking and locking mechanism, more particularly to a braking and locking mechanism for bicycle.

BACKGROUND

In recent years, road bikes, mountain bikes and other types of bicycles are all popular in the market, and it motivates bicycle manufacturers to pay more attention on improving their products.

The bicycle manufacturers have developed a brake lever assembly having braking and locking or parking function. The brake lever assembly has two groups of hydraulic units. Each group of the hydraulic units has a pressure chamber and a piston movably located in the pressure chamber. One of the pistons is driven by a brake lever of the brake lever assembly for forcing a bicycle caliper to brake a bicycle wheel, and the other of the pistons is driven by a motor for forcing the bicycle caliper to lock the bicycle wheel, avoiding the unwanted movement of the bicycle (e.g., due to slope of ground). However, the brake lever assembly having two groups of the hydraulic units are large in size and high in cost. Therefore, how to solve the aforementioned issues are one of the crucial topics in this field.

SUMMARY OF THE INVENTION

The disclosure provides a bicycle braking and locking mechanism in a configuration with small size and low cost while offering the required functions.

One embodiment of the disclosure provides a bicycle braking and locking mechanism. The bicycle braking and locking mechanism is configured to be mounted on a handlebar. The bicycle braking and locking mechanism includes a brake assembly, a first driving component, and a second driving component. The brake assembly includes a main body, a piston, and a link. The main body is configured to be mounted on the handlebar and has a pressure chamber, the piston is movably located in the pressure chamber, and the link is connected to the piston. The link is configured to be selectively driven by the first driving component or the second driving component so as to move the piston with respect to the pressure chamber.

Another embodiment of the disclosure provides a bicycle braking and locking mechanism. The bicycle braking and locking mechanism is configured to be mounted on a handlebar. The bicycle braking and locking mechanism includes a brake assembly, a first driving component, and a motor assembly. The brake assembly includes a main body, a piston, and a link. The main body is configured to be mounted on the handlebar and has a pressure chamber, the piston is movably located in the pressure chamber, and the link is connected to the piston. The first driving component is pivotably disposed on the main body and connected to the link. The motor assembly is configured to drive the link. The link is configured to be selectively driven by the first driving component or the motor assembly to move the piston with respect to the pressure chamber.

According to the bicycle braking and locking mechanism as discussed in the above embodiment, the link is selectively driven by the first driving component or the second driving component (or the motor assembly) to move the piston with respect to the pressure chamber, such that the bicycle wheel can be braked by operating the first driving component to drive the bicycle caliper, and the bicycle wheel can be locked by using the second driving component (or the motor assembly) to drive the bicycle caliper. Therefore, the bicycle braking and locking mechanism is able to offer braking and locking functions with only one pair of piston and pressure chamber. Compared to the conventional brake lever assembly that requires two pistons and two pressure chambers to achieve the braking and locking functions, the bicycle braking and locking mechanism of the disclosure is in a configuration of smaller size and lower cost.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
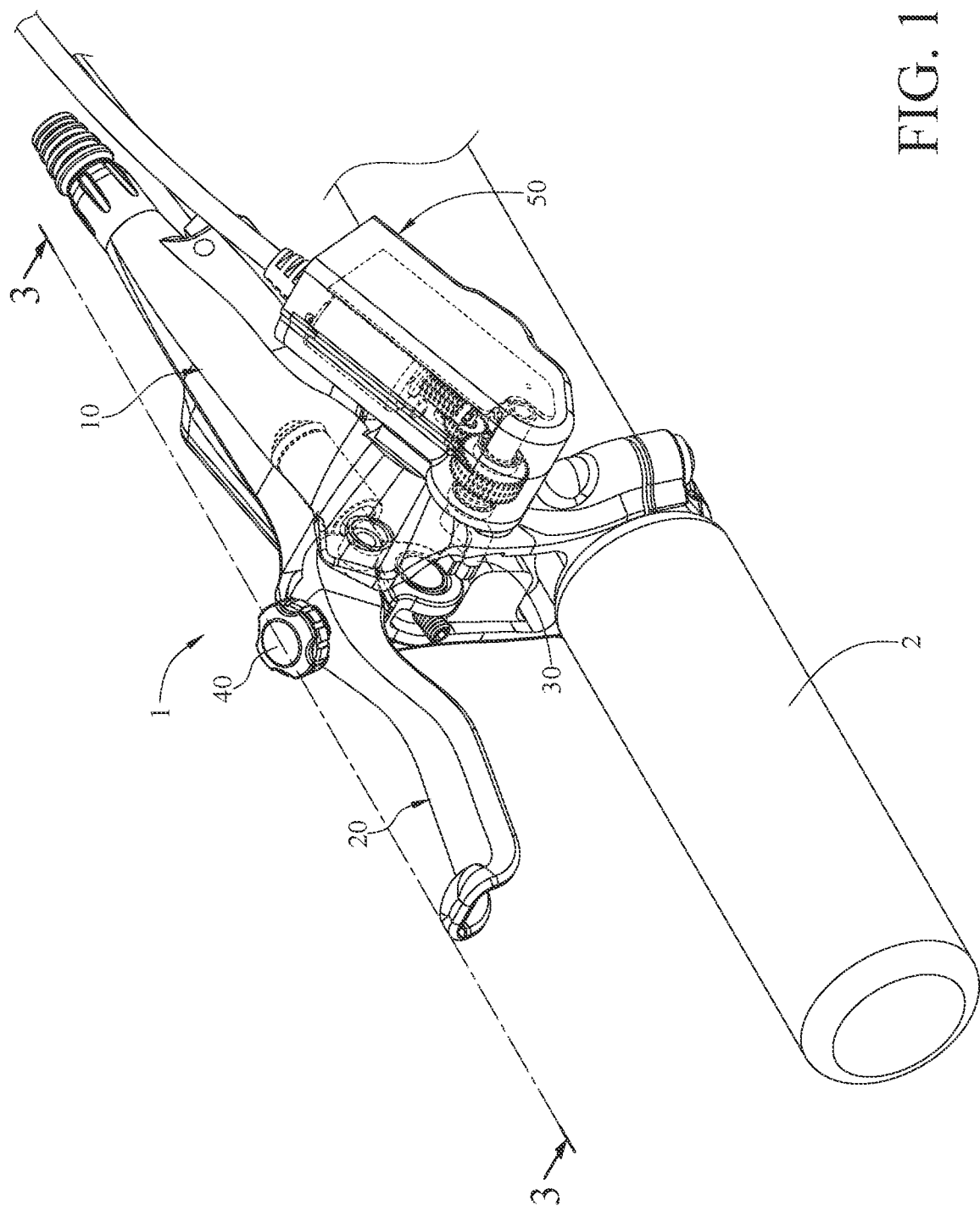
FIG. 1 is a perspective view of a bicycle braking and locking mechanism according to one embodiment of the disclosure and a handle bar.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 2:
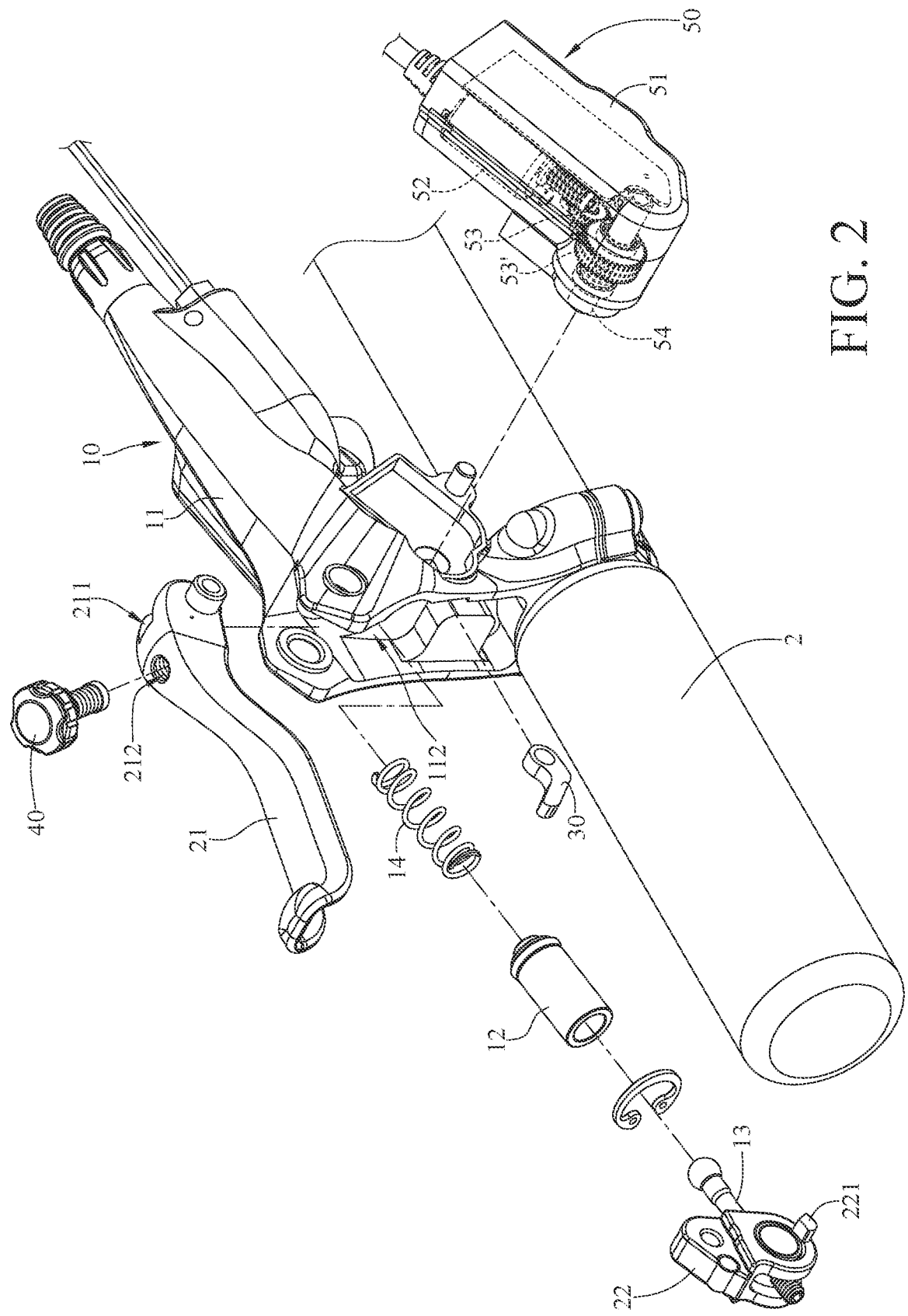
FIG. 2 is an exploded view of the bicycle braking and locking mechanism and the handlebar in FIG. 1.
Figure 3:
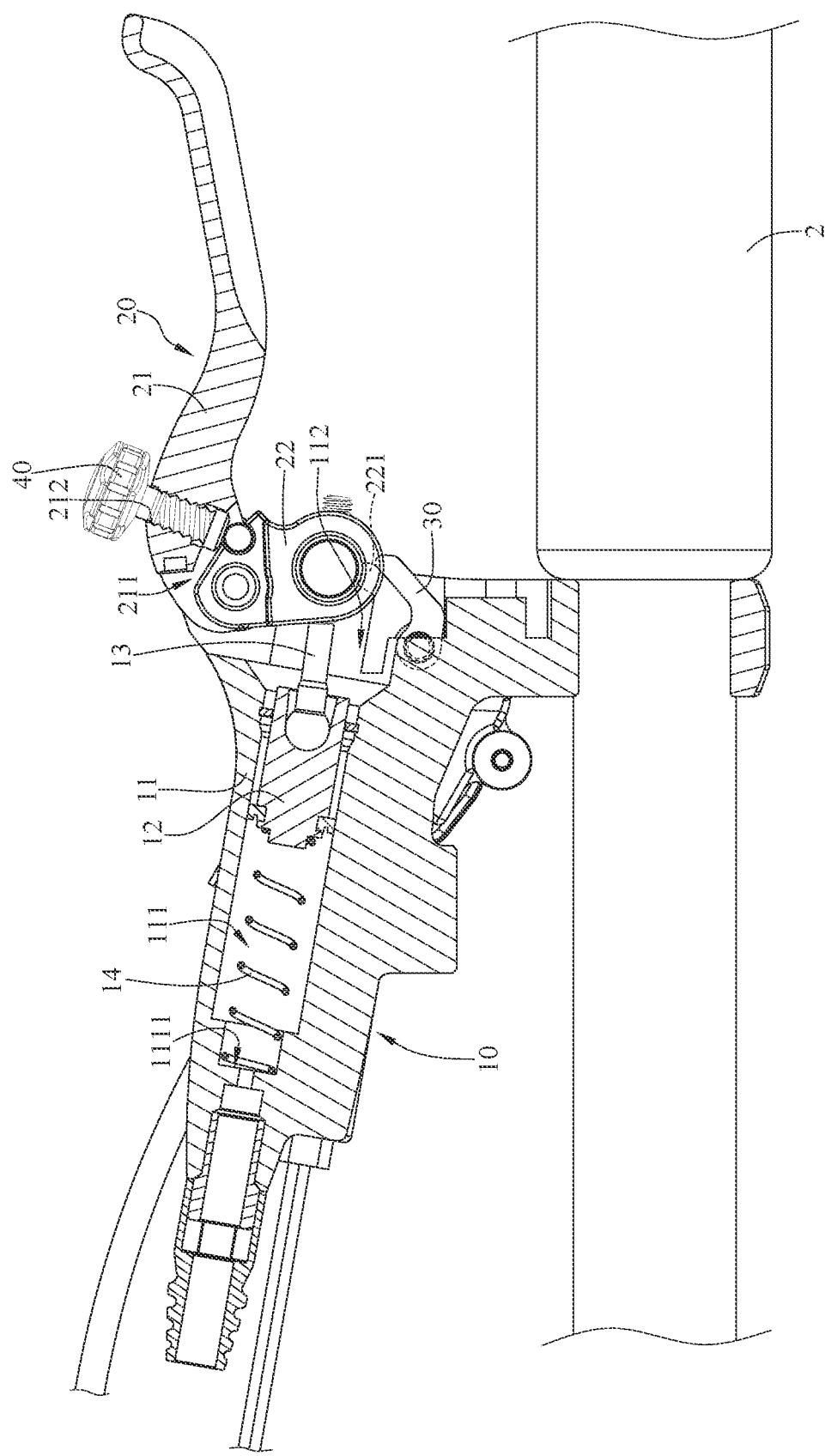
FIG. 3 is a cross-sectional view of the bicycle braking and locking mechanism and the handlebar in FIG. 1 taken along a section line 3-3.

Referring to FIGS. 1 to 3, one embodiment of the disclosure provides a bicycle braking and locking mechanism 1, as shown, the bicycle braking and locking mechanism 1 may be mounted on a handlebar 2.

In this embodiment, the bicycle braking and locking mechanism 1 includes a brake assembly 10, a first driving component 20, and a second driving component 30. In addition, in this or another embodiment, the bicycle braking and locking mechanism 1 may further include an adjustment screw 40 and a motor assembly 50.

The brake assembly 10 includes a main body 11, a piston 12, and a link 13. The main body 11 is configured to be mounted on the handlebar 2. The main body 11 has a pressure chamber 111 and a recess 112 connected to each other. The pressure chamber 111 is connected to, for example, a bicycle caliper (not shown) via a pipe (not shown). The piston 12 is movably located in the pressure chamber 111. One end of the link 13 is connected to the piston 12. The different portions of the link 13 are respectively located in the pressure chamber 111 and the recess 112. In addition, the brake assembly 10 may further include an elastic component 14 located in the pressure chamber 111 of the main body 11. Two opposite ends of the elastic component 14 respectively press against a bottom surface 1111 of the pressure chamber 111 and a side of the piston 12 located away from the link 13. The elastic component 14 is configured to force the piston 12 to move towards a direction away from the bottom surface 1111 of the pressure chamber 111.

The first driving component 20 includes a lever 21 and a transmission component 22. Two opposite ends of the transmission component 22 are respectively connected to the lever 21 and another end of the link 13. Specifically, the lever 21 has a recess 211 located at one end thereof, and one end of the transmission component 22 is located in the recess 211 of the lever 21 so as to be assembled to the lever 21. The portions, that the lever 21 and the transmission component 22 are assembled to each other, are pivotably disposed on the main body 11 and located in the recess 112 of the main body 11.

In this embodiment, the lever 21 further has a screw hole 212 connected to the recess 211. The adjustment screw 40 is screwed into the screw hole 212 of the lever 21, and one end of the adjustment screw 40 is in contact with the transmission component 22. The adjustment screw 40 is rotatable relative to the lever 21 to pivot the lever 21 relative to the main body 11, such that the position of the lever 21 relative to the handlebar 2 is adjustable. Note that the adjustment screw 40 and the screw hole 212 of the lever 21 are optional and may be omitted from some other embodiments.

The motor assembly 50 includes, for example, a casing 51, a motor 52, a plurality of transmission gears 53 and 53', and an output shaft 54. The casing 51 of the motor assembly 50 is mounted on the main body 11 of the brake assembly 10. When the main body 11 of the brake assembly 10 is mounted on the handlebar 2, the casing 51 of the motor assembly 50 is located below the main body 11 of the brake assembly 10; that is, when a bicycle stands on the ground, the casing 51 of the motor assembly 50 is located at a side of the main body 11 of the brake assembly 10 located close to the ground. The motor 52, the transmission gears 53 and 53', and part of the output shaft 54 are located in the casing 51 and connected to one another. The motor 52 is electrically connected to and controlled by, for example, a parking control switch (not shown). The output shaft 54 is disposed through the casing 51 and the main body 11 and is partially located in the recess 112 of the main body 11. The second driving component 30 is located in the recess 112 of the main body 11 and fixed on the output shaft 54, such that the second driving component 30 is pivotably disposed on the main body 11. In this embodiment, the transmission component 22 has, for example, a protrusion 221. The second driving component 30 is in contact with the protrusion 221 of the transmission component 22, such that the second driving component 30 is connected to the link 13 via the transmission component 22.

In this embodiment, selectively, the link 13 may be operated by the first driving component 20 or the second driving component 30, and the details thereof are given in following paragraphs.

Figure 4:
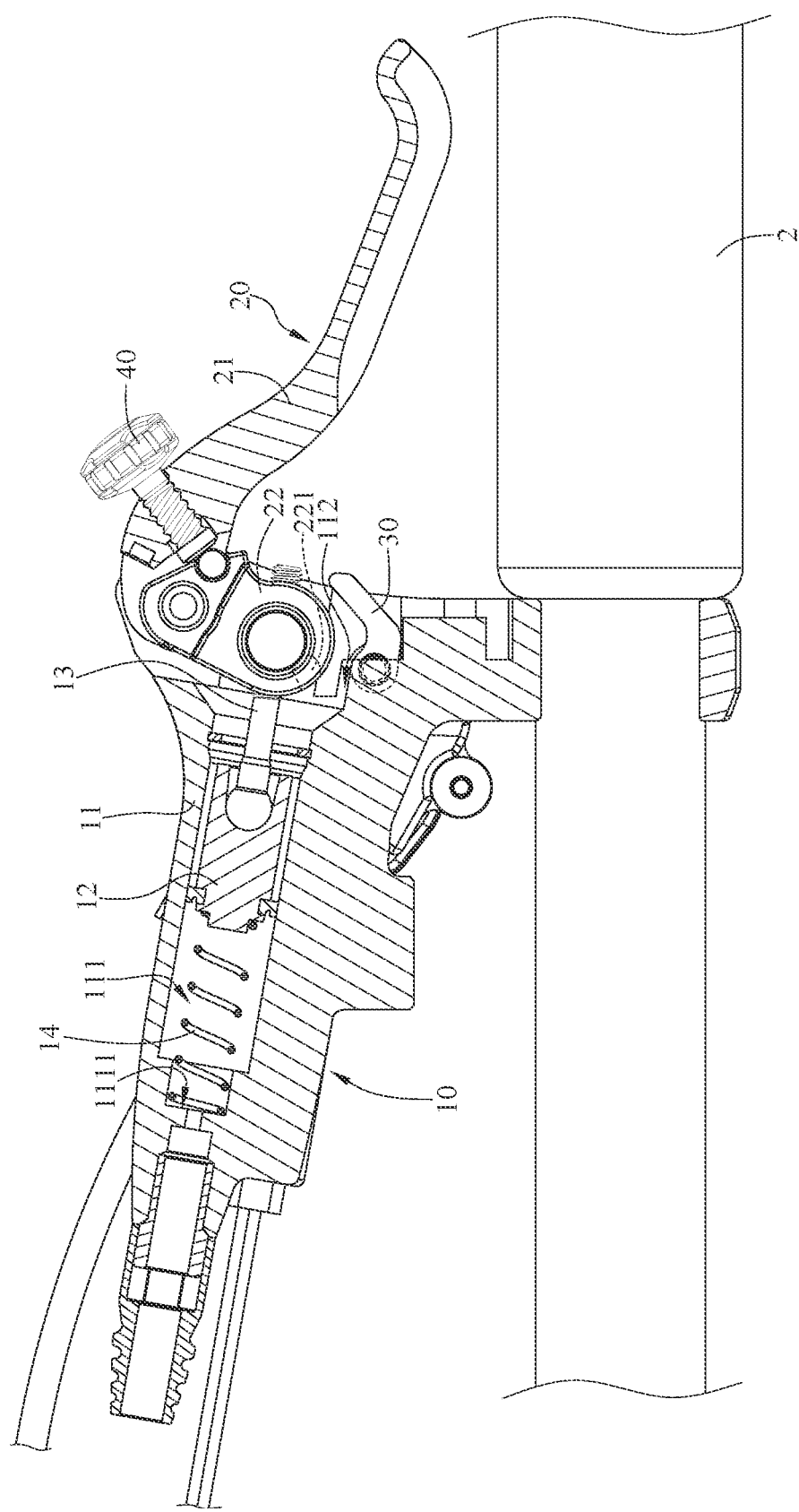
FIG. 4 is a cross-sectional view of the bicycle braking and locking mechanism and the handlebar in FIG. 1 taken along the section line 3-3 when a piston is moved by a first driving component.

Referring to FIG. 4, there is shown a cross-sectional view of the bicycle braking and locking mechanism 1 and the handlebar 2 when the piston 12 is moved by the first driving component 20.

The lever 21 may be pulled to slow down the bicycle, in doing so, the lever 21 forces the transmission component 22 to move the link 13, and the link 13 moves the piston 12 towards the bottom surface 1111 of the pressure chamber 111 so as to squeeze the oil into the bicycle caliper through the pipe and thereby slowing or stopping the wheel from rotating.

Then, referring to FIGS. 2 and 5, how the bicycle braking and locking mechanism 1 works when the piston 12 is moved by the second driving component 30 is described hereinafter.

Figure 5:
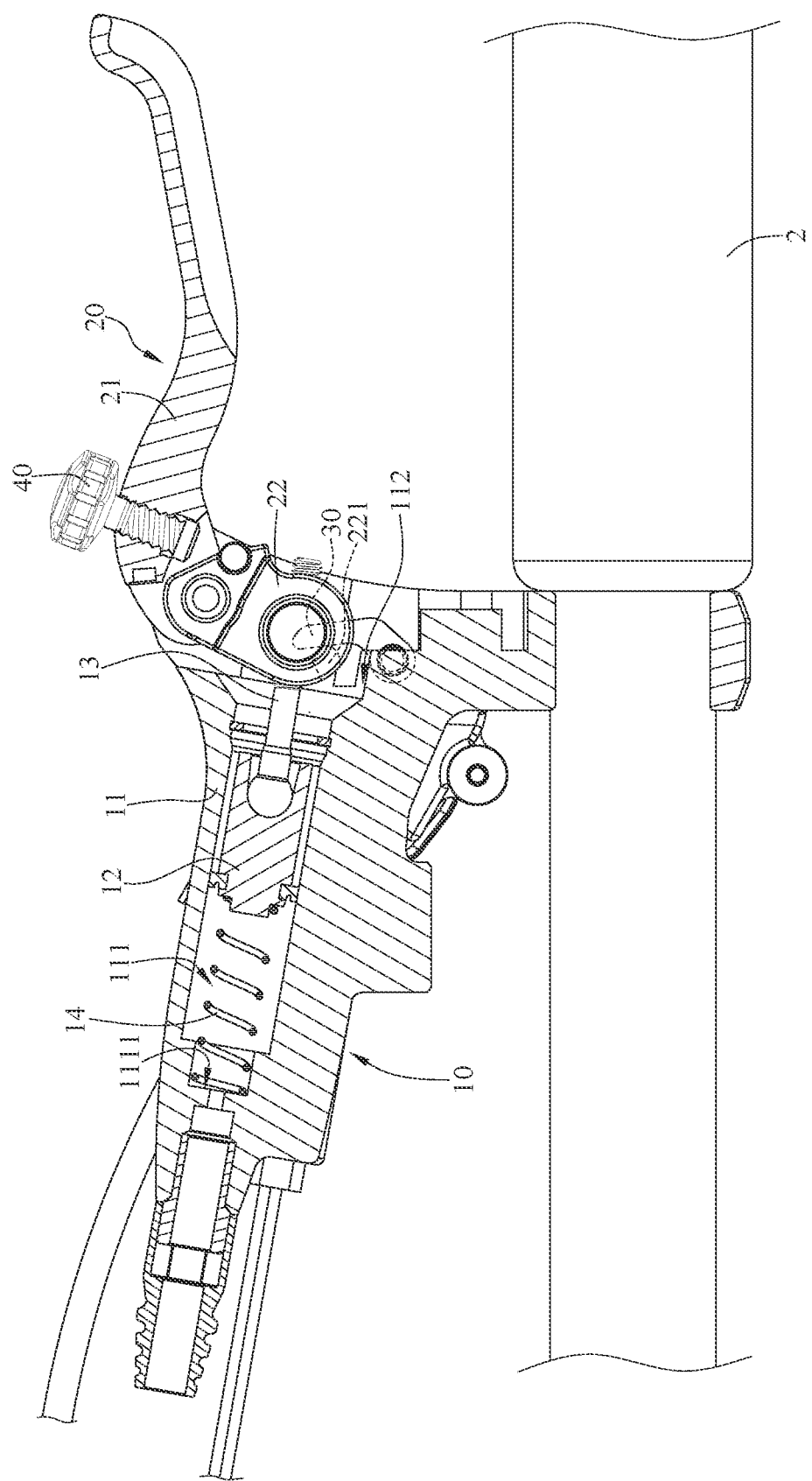
FIG. 5 is a cross-sectional view of the bicycle braking and locking mechanism and the handlebar in FIG. 1 taken along the section line 3-3 when a piston is moved by a second driving component.

As shown in FIGS. 2 and 5, when the wheel stops moving and the rider gets off the bicycle, the parking control switch may be activated to drive the motor 52 to move the second driving component 30 via the transmission gears 53 and 53' and the output shaft 54. In doing so, the second driving component 30 moves the transmission component 22 so as to move the link 13 and the piston 12 towards the bottom surface 1111 of the pressure chamber 111. This action causes the oil to flow into the bicycle caliper and therefore locks the wheel. Accordingly, the bicycle braking and locking mechanism 1 is able to keep the bicycle caliper working during parking, thus it can prevent the bicycle from moving even when parking on a slant or uneven surface.

As discussed, the bicycle braking and locking mechanism 1 is able to offer braking and locking functions with only one pair of piston 12 and pressure chamber 111. Compared to the conventional brake lever assembly that requires two pistons and two pressure chambers to achieve the braking and locking functions, the bicycle braking and locking mechanism 1 of the embodiment is in a configuration of smaller size and lower cost.

In this embodiment, the transmission component 22 is pivotable relative to the lever 21, such that the lever 21 is stationary relative to the main body 11 and is maintained in a predetermined position when the second driving component 30 moves the link 13 via the transmission component 22; that is, the lever 21 is not moved by the transmission component 22, but the disclosure is not limited thereto; in some other embodiments, the transmission component may be fixed to and movable with the lever, such that the transmission component is able to force the lever to pivot relative to the main body when the second driving component moves the link via the transmission component.

In addition, as discussed above, the first driving component and the second driving component are both rotatable relative to the main body, but the disclosure is not limited thereto; in some other embodiments, the first driving component and the second driving component may be linearly movable relative to the main body.

Further, in some other embodiments, the second driving component may directly move the link instead of through the transmission component. Note that the second driving component may be driven by any other suitable means, such as a knob or a lever connected thereto.

Additionally, note that the motor assembly may drive the link merely via the transmission component; in another embodiment, the motor assembly may directly drive the link. Moreover, the motor 52 may be controlled by any suitable mobile device, such as a smartphone.

According to the bicycle braking and locking mechanism as discussed in the above embodiment, the link is selectively driven by the first driving component or the second driving component (or the motor assembly) to move the piston with respect to the pressure chamber, such that the bicycle wheel can be braked by operating the first driving component to drive the bicycle caliper, and the bicycle wheel can be locked by using the second driving component (or the motor assembly) to drive the bicycle caliper. Therefore, the bicycle braking and locking mechanism is able to offer braking and locking functions with only one pair of piston and pressure chamber. Compared to the conventional brake lever assembly that requires two pistons and two pressure chambers to achieve the braking and locking functions, the bicycle braking and locking mechanism of the disclosure is in a configuration of smaller size and lower cost.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A bicycle braking and locking mechanism, configured to be mounted on a handlebar, comprising:
a brake assembly, comprising a main body, a piston, and a link, wherein the main body is configured to be mounted on the handlebar and has a pressure chamber, the piston is movably located in the pressure chamber, and the link is connected to the piston;

a first driving component, pivotably disposed on the main body; and a motor assembly, configured to drive the link;

wherein the link is connected to the first driving component and the motor assembly, and the link is configured to be selectively driven by the first driving component or the motor assembly to move the piston with respect to the pressure chamber;

wherein the first driving component comprises a lever and a transmission component, two opposite ends of the transmission component are respectively connected to the lever and the link, and the motor assembly is configured to drive the link;

wherein when the motor assembly drives the link, the lever is stationary relative to the main body and is maintained in a predetermined position.

2. The bicycle braking and locking mechanism according to claim 1, wherein the motor assembly is configured to drive the link via the transmission component.

3. The bicycle braking and locking mechanism according to claim 2, wherein the lever and the transmission component are together pivotably disposed on the main body.

4. The bicycle braking and locking mechanism according to claim 2, further comprising an adjustment screw, wherein the lever has a screw hole, the adjustment screw is screwed with the screw hole of the lever, an end of the adjustment screw is in contact with the transmission component, and the adjustment screw is rotatable relative to the lever so as to pivot the lever relative to the main body.

\* \* \* \* \*